(12) United States Patent
Rutar

(10) Patent No.: US 11,674,455 B2
(45) Date of Patent: Jun. 13, 2023

(54) VARIABLE DISPLACEMENT PUMP WITH ACTIVE BYPASS FEEDBACK CONTROL

(71) Applicant: Hamilton Sundstrand Corporation, Charlotte, NC (US)

(72) Inventor: Matej Rutar, Manchester, CT (US)

(*) Notice: Subject to any disclaimer, the term of this patent is extended or adjusted under 35 U.S.C. 154(b) by 56 days.

(21) Appl. No.: 17/214,669

(22) Filed: Mar. 26, 2021

(65) Prior Publication Data

US 2022/0307491 A1   Sep. 29, 2022

(51) Int. Cl.
| | |
|---|---|
| *F02C 9/38* | (2006.01) |
| *F02C 7/232* | (2006.01) |
| *F04B 7/00* | (2006.01) |
| *F04B 13/00* | (2006.01) |
| *F04B 49/08* | (2006.01) |
| *F04B 49/22* | (2006.01) |

(52) U.S. Cl.
CPC .............. *F02C 9/38* (2013.01); *F02C 7/232* (2013.01); *F04B 7/0076* (2013.01); *F04B 13/00* (2013.01); *F04B 49/08* (2013.01); *F04B 49/225* (2013.01); *F04B 2205/151* (2013.01)

(58) Field of Classification Search
CPC ........ F04B 7/0076; F04B 13/00; F04B 49/08; F04B 49/225; F04B 2205/151; F02C 9/38; F02C 7/232
USPC ........................................................ 417/220
See application file for complete search history.

(56) References Cited

U.S. PATENT DOCUMENTS

| | | | |
|---|---|---|---|
| 4,285,639 A | 8/1981 | Woodring et al. | |
| 5,715,674 A * | 2/1998 | Reuter | F02C 7/232 |
| | | | 60/39.281 |
| 6,526,743 B2 * | 3/2003 | Maker | F02C 9/263 |
| | | | 60/39.281 |
| 7,690,355 B2 | 4/2010 | Emo et al. | |
| 8,192,172 B2 | 6/2012 | Baker et al. | |
| 8,512,006 B2 * | 8/2013 | Hunter | F04C 2/3442 |
| | | | 417/220 |
| 8,523,537 B2 | 9/2013 | Garry | |
| 8,992,184 B2 * | 3/2015 | Wagner | F01M 1/16 |
| | | | 417/220 |
| 10,890,117 B2 * | 1/2021 | Chalaud | F02C 9/46 |

(Continued)

FOREIGN PATENT DOCUMENTS

| | | |
|---|---|---|
| DE | 102013113342 A1 | 10/2014 |
| EP | 2025933 A2 | 2/2009 |

OTHER PUBLICATIONS

Extended European Search Report for European Patent Application No. EP22162488.5, dated Sep. 6, 2022.

*Primary Examiner* — Charles G Freay
(74) *Attorney, Agent, or Firm* — Locke Lord LLP; Scott D. Wofsy; Joshua L. Jones

(57) ABSTRACT

A system comprises a variable displacement pump, a metering valve, a bypass line, a pressure regulating valve, a position sensor, and a control system. At least one fuel nozzle can be in fluid communication with the output line downstream of the metering valve, wherein the variable displacement pump is configured to supply fuel to the at least one fuel nozzle. The metering valve can be disposed in the output line for controlling outlet flow from the variable displacement pump. The system can also include an actuator line parallel to the variable displacement pump and connected to the output line to provide actuation pressure from pump output of the variable displacement pump.

15 Claims, 2 Drawing Sheets

(56) References Cited

U.S. PATENT DOCUMENTS

2002/0192081 A1* 12/2002 Okada .................... B62D 5/065
                                                    417/220
2005/0100447 A1   5/2005 Desai et al.
2009/0031990 A1*  2/2009 Emo ....................... F02C 9/263
                                                    123/457

* cited by examiner

VARIABLE DISPLACEMENT PUMP WITH ACTIVE BYPASS FEEDBACK CONTROL

BACKGROUND

1. Field

The present disclosure relates generally to pumps, and more particularly to controlling variable displacement pumps used in aircraft fuel systems.

2. Description of Related Art

Fixed displacement pumps need to be oversized for their normal operating needs to meet needs at certain operating conditions such as brief transients. Fixed displacement pumps tend to produce excess output during normal operation. Variable displacement pumps can improve efficiency, i.e. the ability to adjust displacement allows for good pump efficiency across a larger variety of operating conditions, including normal operation and even transients. However, variable displacement pumps require a control scheme. Active pump displacement control can provide customized flow but may not be fast enough to respond to system disturbances. A hydro-mechanical control may provide faster control response but does not have the same adjustability as an active control.

The conventional techniques have been considered satisfactory for their intended purpose. However, there is an ever present need for improved systems and methods for actively controlling pump output to a pressure regulating valve based on valve position. This disclosure provides a solution for this need.

SUMMARY

A system comprises a variable displacement pump, a metering valve, a bypass line, a pressure regulating valve, a position sensor, and a control system. At least one fuel nozzle can be in fluid communication with the output line downstream of the metering valve, such that the variable displacement pump is configured to supply fuel to the at least one fuel nozzle. The metering valve can be disposed in the output line for controlling outlet flow from the variable displacement pump. The system can also include an actuator line parallel to the variable displacement pump and connected to the output line to provide actuation pressure from pump output of the variable displacement pump.

The bypass line can be connected for fluid communication from the output line to an input line in fluid communication with an inlet of the variable displacement pump for bypassing a portion of pump flow from the outlet of the variable displacement pump. An inlet of the bypass line can be connected the output line upstream of the metering valve. The pressure regulating valve can be disposed in the bypass line configured to control pressure drop across the metering valve by bypassing a portion of pump flow back through the variable displacement pump.

The position sensor can be operatively connected to sense position of a valve component of the pressure regulating valve. The position sensor can include a linear variable differential transformer (LVDT) operatively connected between the piston and the valve housing to measure position of the piston relative to the valve housing. The valve component can be a piston slideably engaged inside a valve housing.

The control system can be operatively connected to receive input from the position sensor and operatively connected to control the position of the valve component. The control system can include a controller configured to compare position feedback from the position sensor to a requested position and to output a control signal for control of displacement of the variable displacement pump. The control system can further include an electrohydraulic servo valve (EHSV) operatively connected to the controller and to the variable displacement pump to actuate an adjustment of displacement of the variable displacement pump in response to the control signal from the controller.

A method of controlling a variable displacement pump can include measuring position of a valve component in a pressuring regulating valve in a bypass line bypassing the variable displacement pump, adjusting displacement of the variable displacement pump based on position of the valve component, and supplying fuel to at least one fuel nozzle from the variable displacement pump.

The method can include controlling flow output from the variable displacement pump with a metering valve in an output line in fluid communication with the variable displacement pump, wherein an inlet of the bypass line is connected to the output line upstream of the metering valve. Controlling flow from the variable displacement pump can also include hydraulically controlling pressure change across the metering valve by bypassing a portion of pump flow through the bypass line.

Measuring position of the valve component can include using a position sensor operatively connected between a piston and a valve housing to measure position of the piston relative to the valve housing, wherein the position sensor includes a linear variable differential transformer (LVDT). Adjusting displacement of the variable displacement pump based on position of the valve component can further include comparing position feedback from the position sensor to a requested position and to output a control signal for control of displacement of the variable displacement pump.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
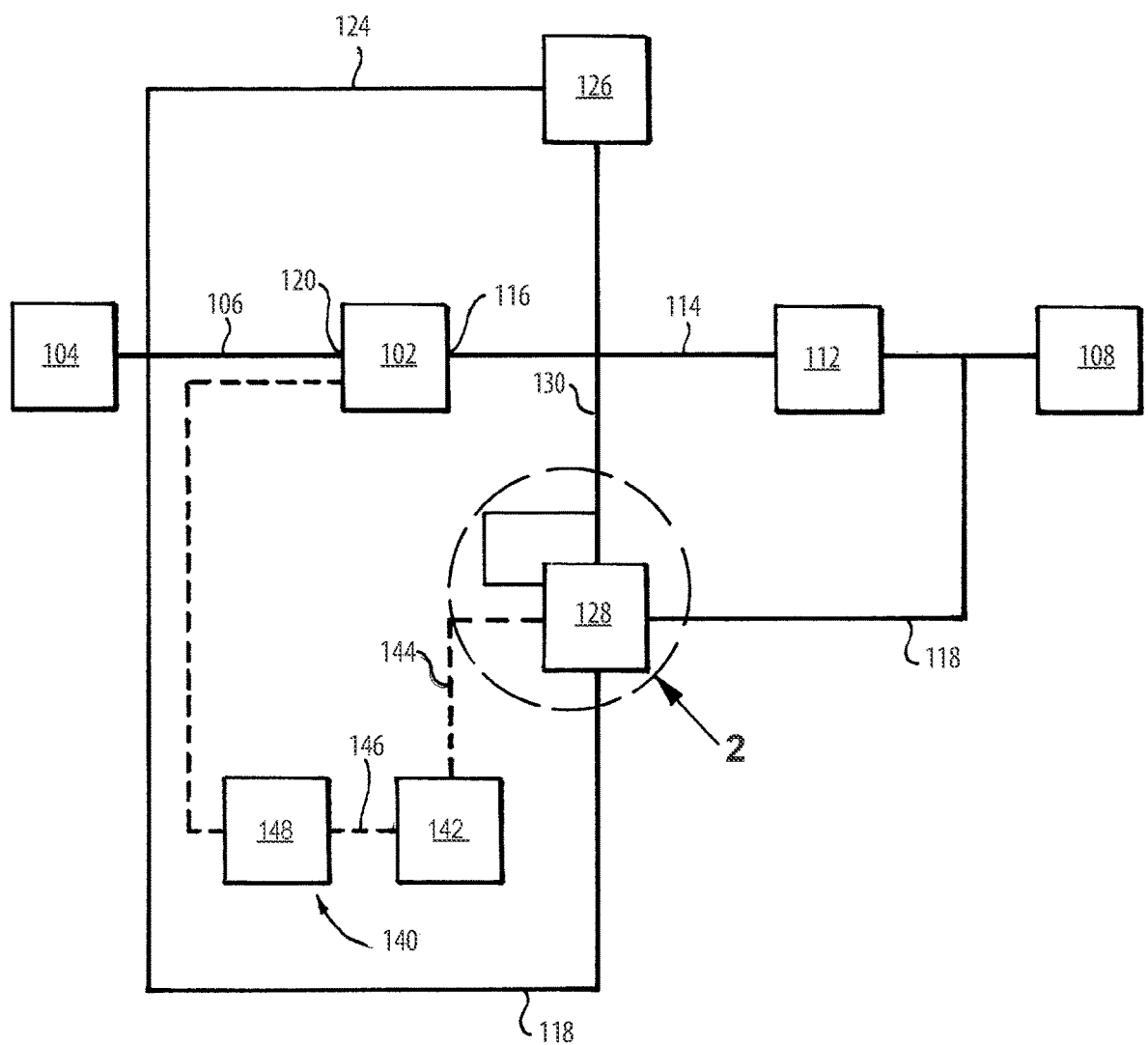
FIG. 1 is a schematic plan view of an embodiment of a flow system constructed in accordance with the present disclosure, showing a control of a variable displacement pump.
Figure 2:
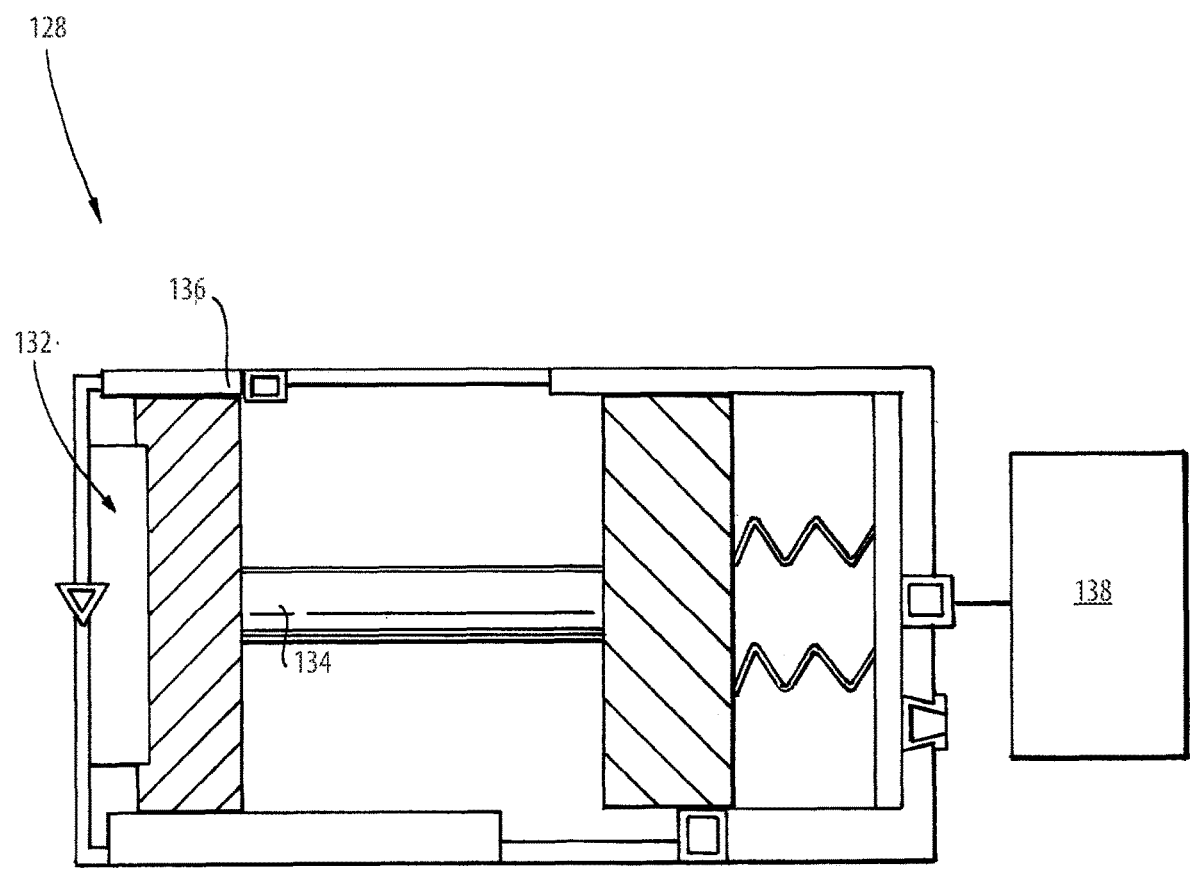
FIG. 2 is a schematic plan view of a pressure regulating valve.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to improve flow control in a fuel system.

A system 100 (e.g. for controlling a variable displacement pump 102) can include a fuel tank 104 and a variable displacement pump 102 disposed in an input line 106 downstream of the fuel tank 104, for issuing fuel to at least one fuel nozzle 108. A metering valve 112 can be disposed in a output line 114, downstream of the variable displacement pump 102 and in fluid communication with an outlet 116 of the variable displacement pump 102. The metering valve 112 can be disposed in the output line 114 for controlling outlet flow from the variable displacement pump 102 to the fuel nozzle(s) 108.

An actuator line 124 can be connected to the input line 106 between the fuel tank 104 and the variable displacement pump 102, in parallel to the variable displacement pump 102 to provide actuation pressure from variable displacement pump 102 to an external actuator 126. The action line 124 can connect to the output line 114 at a position between the variable displacement pump 102 and the metering valve 112.

A bypass line 118 can be connected to the input line 106 between the fuel tank 104 and the variable displacement pump 102 and connected to the output line 114 between the metering valve 110 and the at least one fuel nozzle 108. The bypass line 118 thus allows for fluid communication from the output line 114 to the input line 106 upstream of an inlet 120 of the variable displacement pump 102 for bypassing at least a portion of pump flow from the outlet 116 variable displacement pump 102.

A pressure regulating valve 128 can be disposed in the bypass line 118, and connected to the output line 114 via at least one pressure tap 130. The pressure regulating valve 128 can control pressure drop across the metering valve 112 by sensing pressure upstream and downstream of the metering valve 112 and bypassing at least a portion of pump flow from the upstream side of the metering valve 112. For example, when the pressure through the variable displacement pump 102 exceeds a predetermined threshold, the pressure regulating valve 128 will open to allow a portion of pump flow to enter the bypass line 118, bypassing the metering valve 112, recirculating fuel from the output line 114 to the input line 106.

The pressure regulating valve 128 can include a valve component 132 having a piston 134 slidably engaged within a valve housing 136, and position sensor 138. For example, the position sensor 138 can include a linear variable differential transformer (LVDT) operatively connected between the piston 134 and the valve housing 136 to measure position of the piston 134 relative to the valve housing 136.

A control system 140 can be operatively connected to the pressure regulating valve 128 to control the position of the valve component 132. For example, the control system 140 can include a controller 142 configured to compare position feedback 144 from the position sensor 138 to a requested position and to output a control signal 146 to control displacement of the variable displacement pump 102 based on the position of the valve component 132. A hydraulic valve 148 (e.g. an electrohydraulic servo valve (EHSV)) can be operatively connected to the controller 142 and to the variable displacement pump 102 to actuate an adjustment of displacement of the variable displacement pump 102 in response to the control signal 146.

A method of controlling a variable displacement pump 102 can include measuring the position of the valve component 132 in the pressuring regulating valve 128 and adjusting displacement of the variable displacement pump 102 based on position of the valve component 132. The output from pump system 100 can be used to supply fuel to at least one fuel nozzle 108 downstream of the variable displacement pump 102.

Controlling the flow output from the variable displacement pump 102 to the fuel nozzles 108 can be accomplished using a metering valve 112 in the output line 114, in fluid communication with the variable displacement pump 102. The pressure change across the metering valve 112 can be hydromechanically controlled by bypassing a portion of pump flow through the bypass line 118 using pressure regulating valve 128. The position of the valve component 132 can be measured relative to the valve housing 136, and displacement of the variable displacement pump 102 can be adjusted by comparing position feedback 144 from the position sensor 138 to a requested position and outputting a control signal 146 to actively control displacement of the variable displacement pump 102.

The methods and systems of the present disclosure, as described above and shown in the drawings, provide for faster response of a pressure regulating valve and additional adjustability of an active pump displacement control. While the apparatus and methods of the subject disclosure have been shown and described, those skilled in the art will readily appreciate that changes and/or modifications may be made thereto without departing from the scope of the subject disclosure.

What is claimed is:

1. A system comprising:
   a variable displacement pump;
   a metering valve in an output line for controlling outlet flow from the variable displacement pump to at least one fuel nozzle;
   a bypass line connected for fluid communication from the output line to an input line in fluid communication with an inlet of the variable displacement pump for bypassing a portion of pump flow from the outlet of the variable displacement pump, wherein the bypass line connects to the output line upstream of the metering valve via a pressure tap and connects to the output line downstream of the metering valve;
   a pressure regulating valve in the bypass line configured to control pressure drop across the metering valve by bypassing a portion of the pump flow back through the variable displacement pump;
   a position sensor operatively connected to sense position of a valve component of the pressure regulating valve; and
   a control system operatively connected to receive input from the position sensor and operatively connected to control displacement of the variable displacement pump based on the position of the valve component.

2. The system as recited in claim 1, wherein the valve component is a piston slideably engaged inside a valve housing.

3. The system as recited in claim 2, wherein the position sensor includes a linear variable differential transformer (LVDT) operatively connected between the piston and the valve housing to measure position of the piston relative to the valve housing.

4. The system as recited in claim 1, further comprising the least one fuel nozzle in fluid communication with the output line downstream of the metering valve, wherein the variable displacement pump is configured to supply fuel to the at least one fuel nozzle.

5. The system as recited in claim 1, wherein the control system includes a controller configured to compare position feedback from the position sensor to a requested position and to output a control signal for control of displacement of the variable displacement pump.

6. The system as recited in claim 5, wherein the control system includes an electrohydraulic servo valve (EHSV) operatively connected to the controller and to the variable displacement pump to actuate an adjustment of displacement of the variable displacement pump in response to the control signal from the controller.

7. The system as recited in claim 1, further comprising an actuator line parallel to the variable displacement pump and connected to the output line to provide actuation pressure from pump output of the variable displacement pump.

8. A method of controlling a variable displacement pump comprising:
measuring position of a valve component in a pressuring regulating valve in a bypass line bypassing an outlet of the variable displacement pump; and
adjusting displacement of the variable displacement pump based on position of the valve component, wherein the bypass line connects to the output line upstream of a metering valve via a pressure tap and connects to the output line downstream of the metering valve.

9. The method as recited in claim 8, further comprising controlling flow output from the variable displacement pump with the metering valve in an output line in fluid communication with the variable displacement pump, wherein an inlet of the bypass line is connected to the output line upstream of the metering valve.

10. The method as recited in claim 8, further comprising hydraulically controlling pressure change across the metering valve by bypassing a portion of pump flow through the bypass line.

11. The method as recited in claim 10, wherein measuring position of the valve component includes using a position sensor operatively connected between a piston and a valve housing to measure position of the piston relative to the valve housing, wherein the position sensor includes a linear variable differential transformer (LVDT).

12. The method as recited in claim 8, further comprising supplying fuel to at least one fuel nozzle from the variable displacement pump.

13. The method as recited in claim 12, wherein adjusting displacement of the variable displacement pump based on position of the valve component includes comparing position feedback from the position sensor to a requested position and to output a control signal for control of displacement of the variable displacement pump.

14. The method as recited in claim 13, further comprising using an electrohydraulic servo valve (EHSV) to actuate an adjustment of displacement of the variable displacement pump.

15. The system as recited in claim 1, wherein the metering valve is hydromechanically controlled by bypassing a portion of pump flow through the bypass line using the pressure regulating valve.

* * * * *